United States Patent [19]

Caterisano

[11] Patent Number: 5,796,718
[45] Date of Patent: Aug. 18, 1998

[54] METHOD OF AND SYSTEM FOR INTELLIGENT ACCESS LINE PROTECT SWITCHING

[75] Inventor: Terry A. Caterisano, Allen, Tex.

[73] Assignee: MCI Communications Corporation, Washington, D.C.

[21] Appl. No.: 720,414

[22] Filed: Sep. 30, 1996

[51] Int. Cl.$^6$ .............................. G06F 11/20; H04J 3/14
[52] U.S. Cl. .................. 370/217; 370/227; 340/825.01; 340/827; 379/273; 379/279; 395/182.02
[58] Field of Search ........................ 370/216, 217, 370/218, 219, 220, 225, 227, 228, 242, 244, 522; 340/825.01, 825.03, 826, 827; 379/93.01, 93.05, 93.06, 93.07, 219, 220, 221, 271, 272, 273, 279; 395/181, 182.01, 182.02

[56] References Cited

U.S. PATENT DOCUMENTS

| | | | |
|---|---|---|---|
| 4,665,516 | 5/1987 | Middleton et al. | 370/496 |
| 5,010,550 | 4/1991 | Hirata | 370/228 |
| 5,084,816 | 1/1992 | Boese et al. | 370/225 |
| 5,130,974 | 7/1992 | Kawamura et al. | 370/217 |
| 5,347,271 | 9/1994 | Iwasaki | 370/218 |

*Primary Examiner*—Alpus H. Hsu

[57] ABSTRACT

A method and system for providing intelligent protection against access line failures in a telecommunications system including customer premises equipment connected by a plurality of access lines to a data transport network. The system detects a line fault on a first access line at the customer premises equipment. In response to the detection of a line fault, the system sends a query to the network management system of the data transport network to determine the origin of the line fault. The system receives a response to the query from the network management system and uses the response to deal with the line fault in an intelligent manner. Whenever the network management system responds to the query by indicating that the line fault originated in the data transport network, the system maintains the connection and waits for the failure to be resolved. Whenever the network management system responds to the query by indicating that the line fault originated in the first access line, the system switches to a second access line, thereby to establish an alternative connection between the customer premises equipment and the data transport network.

22 Claims, 3 Drawing Sheets

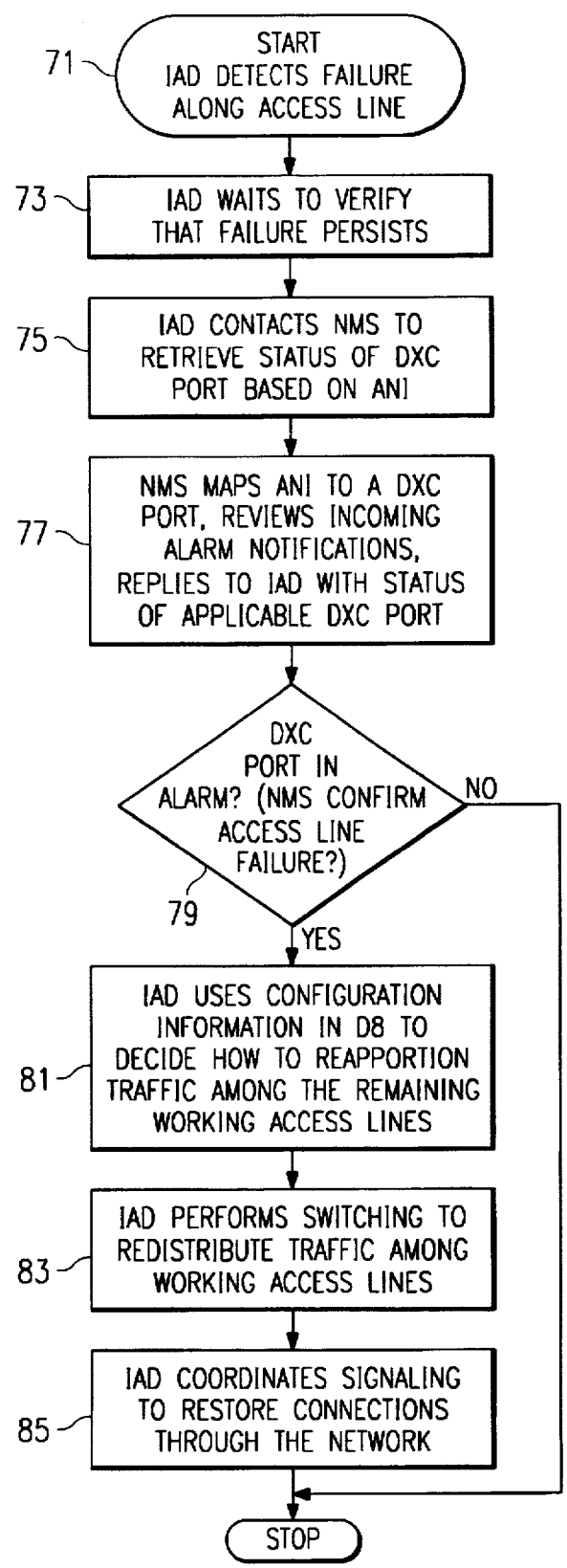

METHOD OF AND SYSTEM FOR INTELLIGENT ACCESS LINE PROTECT SWITCHING

FIELD OF THE INVENTION

The present invention relates generally to telecommunications system switching, and more particularly to an intelligent system for protecting against access line failure between customer premises equipment and a data transport network.

DESCRIPTION OF THE PRIOR ART

Sophisticated data transport networks give private line telephone customers high bandwidth upon which they may transmit their data virtually anywhere in the world. However, private line customers typically rely on local exchange carriers to provide connectivity to the data transport network. The local exchange carrier provides an access line that connects the private line customer to the data transport network.

An access line can suffer failure from a variety of causes. Although a data transport network has a variety of systems and mechanisms for circumventing failed network elements, local exchange carrier access lines are usually unprotected. Thus, the access line is a weak link in an otherwise robust end-to-end connection. Accordingly, a mechanism is needed for ensuring a reliable access line connection to afford private line customers with continuous access to data transport networks.

At first, a simple automatic line protect switching (ALPS) scheme would seem to be adequate to ensure connectivity between the customer premises equipment and the data transport network. ALPS involves maintaining a second, diversely-routed, spare access line that can be switched into service instantly upon detecting a failure along the primary access line. However, customer premises equipment cannot distinguish between an access line failure and a failure in the data transport network. Data transport networks typically employ mechanisms for automatically restoring themselves to service in the event of a failure. Thus, if the fault is in the data transport network, the customer premises equipment should maintain the connection and simply wait for the data transport network to restore itself. However, with ALPS, detection of a line fault triggers the customer premises equipment automatically and unnecessarily to switch to the spare access line.

An additional shortcoming of ALPS is its expense and inefficiency. A major element of capital investment in telephone systems is in the telephone lines themselves. Not only are the lines expensive in terms of the cost of the cabling, but also in terms of the cost of poles, tunneling and boring, and the cost of acquiring and maintaining easements. Thus, it is very expensive to maintain a separately routed diverse spare access line to be used in the event of a failure of a primary access line.

SUMMARY OF THE INVENTION

In the present invention, a method and system are provided for intelligent protection against access line failures in a telecommunications system including customer premises equipment connected by a plurality of access lines to a data transport network. The data transport network includes a network management system. The access lines include at least one active access line forming an active connection to transmit data between the customer premises equipment and the data transport network. The access lines also include at least one alternative access line, which may itself be active, available to establish an alternative connection to transmit data between the customer premises equipment and the data transport network.

In the present invention, the system detects a line fault on a first access line at the customer premises equipment. In response to the detection of a line fault, the system sends a query to the network management system to determine the origin of the line fault. The system receives a response to the query from said network management system and uses the response to deal with the line fault in an intelligent manner.

Data transport networks are robust, fault tolerant systems that are typically mesh restorable. When a failure occurs within the data transport network, the network management system finds an alternative path and quickly restores the network. Thus, whenever the network management system responds to the query by indicating the line fault originated in the data transport network, the system of the present invention maintains the connection between the customer premises equipment and the data transport network through the first access line, thereby waiting for the failure to be resolved.

Access lines tend not to be fault tolerant. Accordingly, whenever the network management system responds to the query by indicating that the line fault originated in the first access line, the system of the present invention switches to a second access line, thereby to establish an alternative connection between the customer premises equipment and the data transport network. In the event the system of the present invention switches to an alternative connection, the system may notify the network management system of the new entry point to the data transport network for the traffic.

The system of the present invention may send queries and messages to, and receive responses from, the network management system through the active or an alternative access line. Alternatively, the system may establish a dial-up connection between the customer premises equipment and the network management system, and carry on communications through the dial-up connection.

Traffic over the active access line may include different call types. The administrator of the customer premises equipment may have designated certain call types as being mission critical or of a higher priority than other call types. At the time of the failure, the alternative access lines may not have enough unused bandwidth available to accommodate all of the traffic carried on the active access line. Accordingly, the whenever the response from the network management system indicates that line fault originated in the active access line, the system of the present invention may switch a selected subset of call types to an alternative access line. The system may provide for preempting low priority traffic on the alternative access line to provide bandwidth for mission critical traffic.

The system of the present invention may be implemented in an intelligent access device that includes a plurality of multiplexers connected a customer switch that is operated by a controller. Each multiplexer is connected to a separate access line and each access line is connected to a separate switch of the data transport network. The controller operates the switch to route selected calls from the customer premises to a selected one of the multiplexers, thereby to establish a connection over the access line connecting the selected multiplexer and the separate switch of the data transport network.

Each multiplexer is capable of detecting line faults and sending line fault detection information to the controller.

The controller formulates a query and sends the query to the network management system to determine the origin of a line fault detected at a multiplexer. Upon to receipt of a response to a query, the controller evaluates the response to determine how best to respond to the fault, either by waiting for the data transport network to restore itself or by switching some or all of the traffic to an alternative access line. The controller preferably has access to a database that it may use to select a subset of calls to switch to an alternative access line.

BRIEF DESCRIPTION OF THE DRAWINGS

FIG. 2 is a high level flow chart of the logic of the preferred software implementation of the present invention.

DESCRIPTION OF THE PREFERRED EMBODIMENT

Figure 1A:
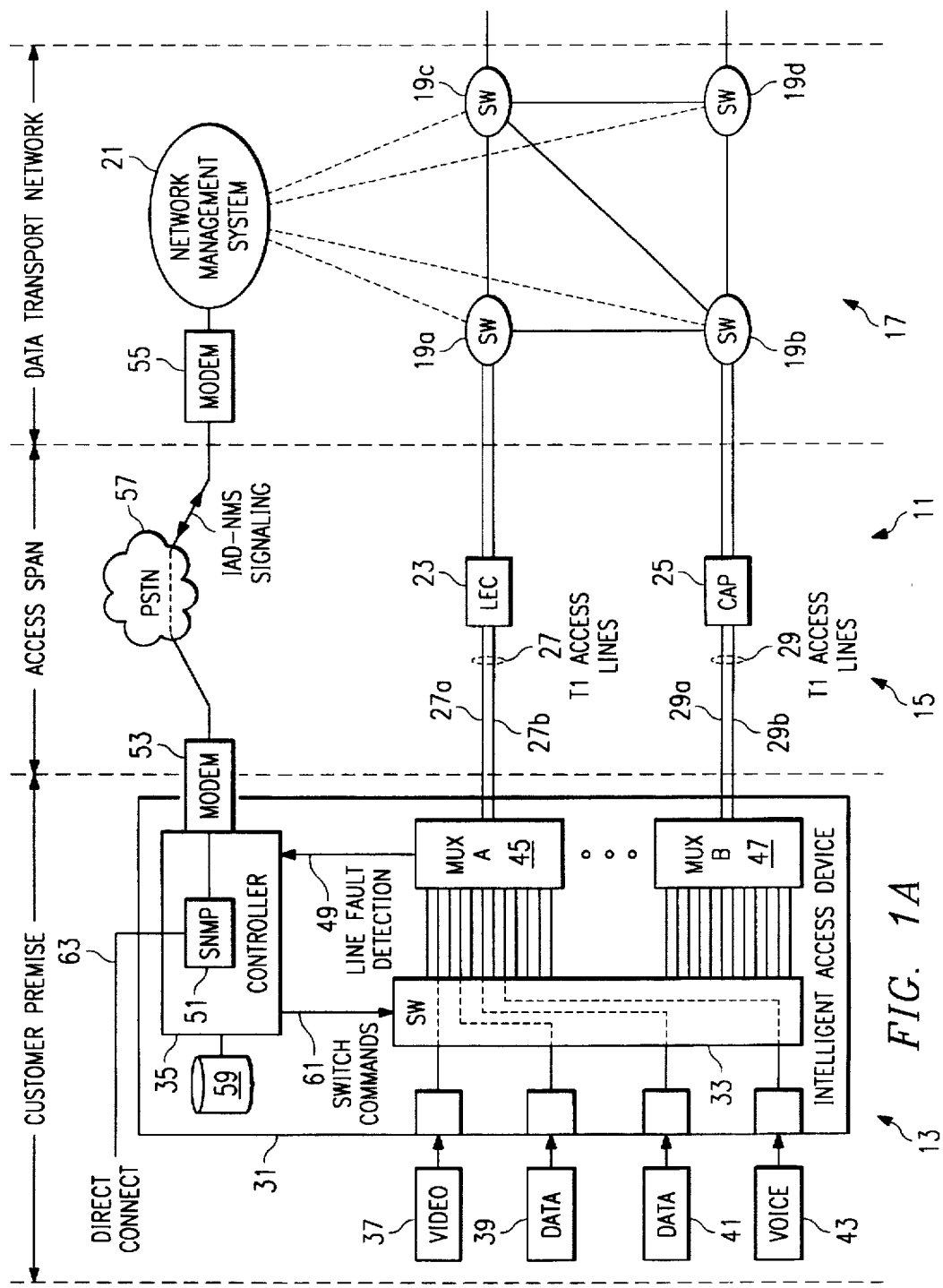
FIG. 1A is a block diagram of an out-of-band signalling embodiment of the system of the present invention.

Referring now to the drawings, and first to FIG. 1A, a telecommunications system is designated generally by the numeral 11. Telecommunication system 11 includes customer premises equipment, designated generally by the numeral 13, an access span, designated generally by the numeral 15, and a data transport network, designated generally by the numeral 17. Those skilled in the art will recognize that system 11 also includes a similar access spans and customer premises equipment at the other end of data transport network 17.

Data transport network 17 includes a plurality of high capacity broad band digital cross-connect switches, including switches 19a–19d. As shown in FIG. 1A, switches 19a–19d are interconnected in a mesh topology. Data transport network 17 also includes a network management system 21. Network management system 21 is connected to each switch 19 of data transport network 17 by data links. Network management system 21 sends commands to and receives messages from switches 19 over the data links. Network management system 21 controls switches 19 thereby to route traffic through data transport network 17.

Those skilled in the art will recognize that data transport network 17 is much more complex and includes many more network elements than what is shown in FIG. 1A. For example, data transport network 17 includes a plurality of repeaters spaced apart along the transmission lines interconnecting switches 19. The repeaters serve to restore and regenerate the signals between the switches. The repeaters also communicate with network management system 21 over data links. Switches 19 and the repeaters include means for detecting and processing line faults. For example, when a switch or repeater detects a loss of signal, it transmits an alarm indication signal on its transmission line and sends a notification of the loss of signal to the network management system. Network management system 21 uses the fault information received from switches 19 and the repeaters to isolate the physical location of the origin of the fault. Additionally, network management system 21 uses the fault information to instruct switches 19 to redirect their traffic around the location of the fault. Thus, the mesh topology of data transport network 17 gives the network mesh restorability.

Access span 15 comprises the equipment of a plurality of local telephone companies, including a local exchange carrier (LEC) 23 and a competitive access provider (CAP) 25. LEC 23 and CAP 25 each provide separate and independent access from customer premises 13 to data transport network 17. Thus, in FIG. 1A, LEC 23 provides a T1 access line 27 that connects customer premises 13 to switch 19a of data transport network 17. Similarly, CAP 25 provides a T1 access line 29 that connects customer premises 13 with switch 19b of data transport network 17.

Customer premises equipment 13 includes an intelligent access device 31. Intelligent access device 31 includes a customer switch 33 that is controlled by a controller 35. As shown in FIG. 1A, intelligent access device 31 is adapted to receive call type input from numerous information sources. Each call type input signal is digitally encoded and multiplexed to form a composite T1 signal at 1.544 mbps. For example, these signals may include a video signal 37 at 384 kbps, a computer data signal 39 at 64 kbps, a data signal 41 at 56 kbps, and a voice signal 43 at 64 kbps.

Customer switch 33 is capable of distributing the inputs among a plurality of multiplexers, including multiplexer 45 and multiplexer 47. Multiplexer 45 is connected to T1 access line 27. Thus, multiplexer 45 is capable of establishing a connection with data transport network 17 through switch 19a. Similarly, multiplexer 47 is connected to T1 access line 29, thereby enabling multiplexer 47 to establish a connection between customer premises equipment 13 and data transport network 17 at switch 19b.

In FIG. 1A, inputs 37–43 are shown connected through customer switch 33 to multiplexer 45. Those skilled in the art will recognize that intelligent access device 31 may have simultaneous other inputs that are routed to other multiplexers, for example multiplexer 47, through customer switch 33.

In general, a T1 line comprises a pair of lines that accommodate in-bound and out-bound signals. Thus access line 27 includes an in-bound line 27a and an out-bound line 27b. Similarly, access line 29 includes an in-bound line 29a and an out-bound line 29b. For purposes of illustration, it will be assumed that both directions of an access line fail at the same time. If T1 access line 27 were to be damaged, then multiplexer 45 would observe a fault in the incoming signal and generate an alarm indication signal. However, if the fault originated in data transport network 21, multiplexer 45 would receive an alarm indication signal and likewise generate and indistinguishable alarm indication signal.

Multiplexer 45 is connected to controller 35 by a line fault detection line 49. When controller 35 receives a notification of a line fault, it formulates a query, preferably with simple network management protocol (SNMP) 51 to ascertain from network management system 21 the origin of the line fault. It will be recognized that all the multiplexers in intelligent access device 31, including multiplexer 47, are connected to controller 35 by line fault detection lines.

In the embodiment shown in FIG. 1A, controller 35 communicates with network management system 21 through a dial-up connection. Thus, intelligent access device 31 includes a modem 53 that is capable of dialing up a modem 55 connected to network management system 21 through a public switched telephone network 57. The query formulated by controller 35 identifies the entry point to data transport network 17 as switch 19a and requests information as to the status of the port of switch 19a connected to T1 access line 27. Upon receipt of a query, network management system 21 reviews the incoming alarm notification at the applicable port, and formulates an appropriate response. If the applicable port of switch 19a is not in alarm, then the failure is not in T1 access line 27. Since data transport network 17 has mechanisms for correcting internal faults, controller 35 simply waits for data transport network to restore itself. If, on the other hand, the applicable port of switch 19a is an alarm, which indicates that the failure is in T1 access line 27, controller 35 initiates action to switch the traffic from active access line 27 to an alternative access line.

Intelligent access device 31 includes a database 59 that contains information as to the priority of traffic originating at the customer premises. For example, certain computer data may be mission critical. Controller uses information from database 59 to map the traffic to available alternative T1 access lines. If there is sufficient unused bandwidth on alternative access lines, then controller 35 sends switch commands through a line 61 to cause switch 33 to reroute all of inputs 37–43 to an alternative multiplexer, for example to multiplexer 47. If there is not sufficient unused bandwidth, then controller 35 reroutes the highest priority calls and drops lower priority calls. Alternatively, controller 35 may determine from the information of database 59 that some of the calls currently routed to multiplexer 45 are of higher priority than other calls currently routed to other multiplexers. In such case, controller 35 may terminate lower priority calls to create available bandwidth for inputs 37–43. After controller 35 has caused customer switch 33 to reroute traffic through alternative access line 29, controller 35 sends network management system 21 a message advising of the new routing.

Intelligent access device 31 may also include a direct connect line 63. Direct connect line 63 enables a customer premises network administrator to initiate queries and messages to network management system 21. Thus, the customer premises network administrator can ascertain the status of data transport network 17 and communicate with network management system 21 to provide or request status information and the like.

Figure 1B:
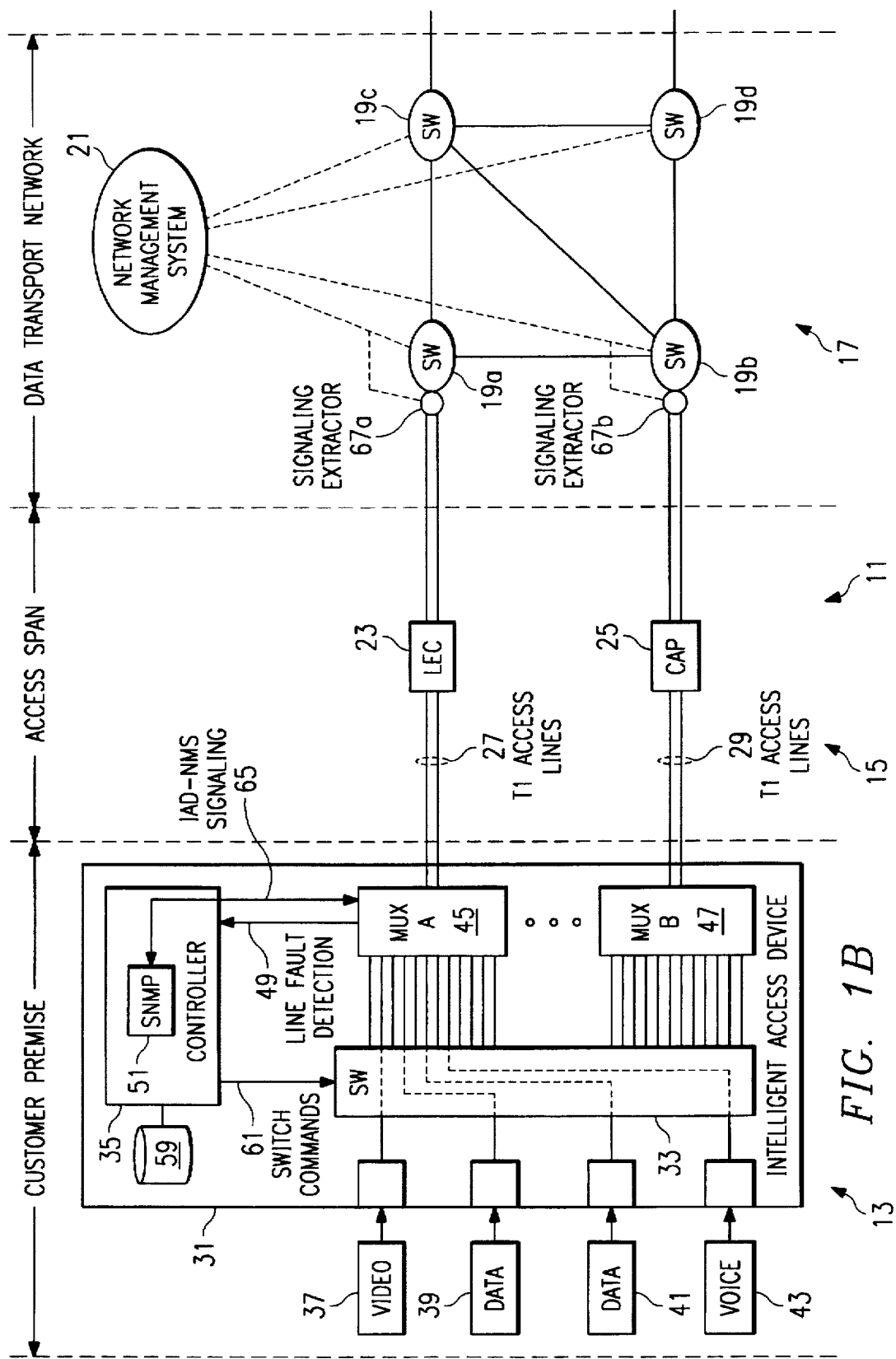
FIG. 1B is a block diagram of an in-band signalling embodiment of the system of the present invention.

Referring now to FIG. 1B, there is shown an alternative embodiment of the system of the present invention. In the embodiment of FIG. 1B, like reference characters are assigned to like system elements. When multiplexer 45 receives a line fault indication, it sends a line fault detection signal to controller 35 over line 49. Controller 35 formulates a query, but rather than establishing a dial-up connection with network management system 21, controller 35 formulates an in-band query and sends the query to network management system 21 through one of the T1 access lines. Thus, signalling lines 65 are connected between controller 35 and multiplexer 45–47. Data transport network 17 includes signalling extractors 67a and 67b that are adapted to peel off signals from access lines 27 and 29 and send the signals to network management system 21. Network management system 21 processes queries received and formulates appropriate responses in the manner previously described.

Referring now to FIG. 2, there is shown a flow chart of a preferred software implementation of the present invention. The process starts at block 71 when the intelligent access line detects a failure along an access line. Upon detection of a failure, the intelligent access device waits, at block 73, to verify that the failure persists. Certain failures may be transient and correct themselves within a matter of milliseconds. After the line failure has persisted, the intelligent access device contacts the network management system to retrieve the status of the digital cross-connect device port based on the identification of the involved T1 access line, at block 75.

The network management system maps the identifier for the T1 access line to one of its digital cross-connect device ports, reviews incoming alarm notifications at that port, and replies to the intelligent access device with the status of the applicable digital cross-connect device port, at block 77. The intelligent access device then tests, at decision block 79, whether the response from the network management system indicates that the digital cross-connect device port is in alarm. If not, which indicates that the failure originated in data transport network 17, the process ends and the intelligent access device takes no action to correct the fault. If, on the other hand, at decision block 79, the digital cross-connect device port is in alarm, which indicates that the failure originated in the access line, the intelligent access device uses configuration information in the data base to decide how to reapportion traffic among the remaining working access lines, at block 81. After having decided how to reapportion the traffic, the intelligent access device performs switching to redistribute traffic among working access lines at block 83. Then, the intelligent access device coordinates signalling to restore connections throughout the network, at block 85.

From the foregoing, it may be seen that the present invention overcomes the shortcomings of the prior art. The present invention is particularly adapted for use by large customers that have multiple access lines provided by separate local exchange carriers or competitive access providers. The system of the present invention does not waste resources by relying on spare, normally unused, access lines, as is required to implement an automatic line protect switching scheme. The system of the present invention uses the sophistication and fault-tolerant nature of a data transport network to enable customer premises equipment to handle failures in a normally unsophisticated access span system.

What is claimed is:

1. In a telecommunications system including customer premises equipment, a data transport network including a network management system, and a plurality of access lines for establishing a connection between said customer premises equipment and said data transport network, a method of intelligent access line protection, said method comprising the steps of:

detecting a line fault on a first access line at said customer premises equipment;

sending a query to said network management system to determine the origin of said line fault;

receiving a response to said query from said network management system;

whenever said response from said network management system indicates said line fault originated in said data transport network, maintaining a connection between said customer premises equipment and said data transport network through said first access line; and, whenever said response from said network management system indicates said line fault originated in said first access line, switching at least some of the traffic on said first access line to a second access line.

2. The method as claimed in claim 1, including the step of:

sending a message to said network management system indicating that said customer premises equipment has switched at least some of said traffic from said first access line to said second access line.

3. The method as claimed in claim 1, wherein said query is sent to said network management system through one of said access lines.

4. The method as claimed in claim 1, wherein said step of sending a query to said network management system includes the steps of:

establishing a dial-up connection between said customer premises equipment and said network management system; and, sending said query through said dial-up connection.

5. The method as claimed in claim 1, wherein said connection between said first access line and said data transport system is established through a first switch of said data transport network, and wherein said query to said network management system requests an alarm status said first switch of said data transport network.

6. The method as claimed in claim 1, wherein traffic over said first access line includes a plurality of input types, and said method includes the step of:

whenever said response from said network management system indicates said line fault originated in said first access line, switching a selected subset of call types to a second access line.

7. A system for providing access line protection between a customer premises and a data transport network, said data transport network including a network management system, said system for providing access line protection comprising:

a customer premises switch;

a plurality of multiplexers connected to said customer premises switch, each of said multiplexers being connected to an access line and each of said access lines being connected to a separate switch of said data transport network;

means for operating said customer premises switch to route selected calls from said customer premises to selected ones of said multiplexers, thereby to establish a connection over access lines connecting said selected multiplexers and said separate switches of said data transport network;

means for detecting a line fault at said multiplexers;

means for sending a query to said network management system to determine the origin of a line fault detected at a multiplexer;

means, responsive to receipt of a response to a query that indicates that a line fault originated in the access line connecting a selected multiplexer to a selected switch of said data transport network, for operating said customer premises switch to route at least some of said selected calls carried on said selected multiplexer to an alternative one of said multiplexers, thereby to connect said selected calls to said data transport network through an alternative access line.

8. The system as claimed in claim 7, including:

means for sending a message to said network management system indicating that at least some of said calls have been switched to said alternative access line.

9. The system as claimed in claim 7, wherein said query is sent to said network management system through one of said multiplexers.

10. The system as claimed in claim 7, wherein said means for sending a query to said network management system includes:

means for establishing a dial-up connection between said customer premises and said network management system; and, means for sending said query through said dial-up connection.

11. In a telecommunications system including customer premises equipment, a data transport network including a network management system, and a plurality of access lines for establishing a connection between said customer premises equipment and said data transport network, a system for providing intelligent access line protection comprising:

means for detecting a line fault on a first access line at said customer premises equipment;

means for sending a query to said network management system to determine the origin of said line fault;

means for receiving a response to said query from said network management system;

means for maintaining a connection between said customer premises equipment and said data transport network through said first access line whenever said response from said network management system indicates said line fault originated in said data transport network; and, means for switching at least some traffic from said first access line to a second access line whenever said response from said network management system indicates said line fault originated in said first access line.

12. The system as claimed in claim 11, including:

means for sending a message to said network management system indicating that said customer premises equipment has switched to said second access line.

13. The system as claimed in claim 11, wherein said query is sent to said network management system through one of said access lines.

14. The system as claimed in claim 11, including:

means for establishing a dial-up connection between said customer premises equipment and said network management system; and, means for sending said query through said dial-up connection.

15. The system as claimed in claim 11, wherein said connection between said first access line and said data transport system is established through a first switch of said data transport network, and wherein said query to said network management system requests an alarm status said first switch of said data transport network.

16. The system as claimed in claim 11, wherein traffic over said first access line includes a plurality of input types, and said system includes:

means for switching a selected subset of input types to a second access line whenever said response from said network management system indicates said line fault originated in said first access line.

17. The system as claimed in claim 16, wherein said selected subset is selected based on a predetermined priority of input types.

18. The system as claimed in claim 17, including means for terminating calls of lower priority input type on said second access line to create bandwidth for calls of higher priority input type to be switched from said first access line.

19. An intelligent access device for providing access line protection between a customer premises and a data transport network, said data transport network including a network management system, said intelligent access device comprising:

a customer premises switch;

a plurality of multiplexers connected to said customer premises switch, each of said multiplexers being adapted for connection to an access line;

means for operating said customer premises switch to route selected calls from said customer premises to selected ones of said multiplexers;

means for detecting line faults at said multiplexers;

means for sending a query to said network management system to determine the origin of a line fault detected at a multiplexer;

means, responsive to receipt of a response to a query that indicates that a line fault originated in the access line connecting a selected multiplexer to a selected switch of said data transport network, for operating said customer premises switch to route at least some of said selected calls carried on said selected multiplexer to an alternative one of said multiplexers.

20. The intelligent access device as claimed in claim 19, including:

means for sending a message to said network management system indicating that at least some of said calls have been switched to an alternative multiplexer.

21. The intelligent access device as claimed in claim 19, wherein said query is sent to said network management system through one of said multiplexers.

22. The intelligent access device as claimed in claim 19, wherein said means for sending a query to said network management system includes:

means for establishing a dial-up connection between said customer premises and said network management system; and, means for sending said query through said dial-up connection.

* * * * *